(12) United States Patent
Havel

(10) Patent No.: US 6,502,649 B1
(45) Date of Patent: Jan. 7, 2003

(54) ICE AUGER CUTTING HEAD

(75) Inventor: Randall L. Havel, Big Lake, MN (US)

(73) Assignee: Strikemaster Corporation, Big Lake, MN (US)

(*) Notice: Subject to any disclaimer, the term of this patent is extended or adjusted under 35 U.S.C. 154(b) by 0 days.

(21) Appl. No.: 09/978,371

(22) Filed: Oct. 15, 2001

Related U.S. Application Data

(60) Provisional application No. 60/239,951, filed on Oct. 16, 2000.

(51) Int. Cl.[7] .............................................. E21B 10/44
(52) U.S. Cl. ......................... 175/18; 175/394; 175/392
(58) Field of Search ........................... 175/18, 323, 392, 175/394

(56) References Cited

U.S. PATENT DOCUMENTS

| | | | |
|---|---|---|---|
| 76,188 A | * 3/1868 | Heath ........................... | 175/318 |
| 893,950 A | * 7/1908 | Thomas ....................... | 175/348 |
| 1,280,696 A | * 10/1918 | Fril ............................... | 175/394 |
| 2,578,014 A | * 12/1951 | Petersen ...................... | 175/383 |
| 2,709,573 A | * 5/1955 | Reed ........................... | 175/388 |
| 2,838,285 A | * 6/1958 | Gredel ......................... | 175/391 |
| 3,175,630 A | 3/1965 | Hein et al. | |
| 3,602,321 A | 8/1971 | Kortschaga | |
| 3,647,008 A | * 3/1972 | Isaksson ....................... | 175/18 |
| 3,786,876 A | 1/1974 | Aaltonen | |
| 4,046,207 A | 9/1977 | Taylor | |
| 4,074,780 A | 2/1978 | Gilbert | |
| 4,488,605 A | * 12/1984 | Ruppel et al. ................. | 175/18 |
| 4,819,744 A | * 4/1989 | Caswell ....................... | 175/18 |
| 5,213,170 A | * 5/1993 | Savitski ....................... | 175/323 |
| 5,251,707 A | 10/1993 | Grahl | |
| 5,302,059 A | 4/1994 | Fabiano | |
| 5,950,738 A | 9/1999 | Caswell et al. | |

\* cited by examiner

*Primary Examiner*—Hoang Dang

(57) ABSTRACT

An auger for drilling fishing holes in ice on a body of water has an elongated shank supporting a continuous helical flight and a plurality of partially helical scoop-like members having leading generally radial edges, ice cutting blades releasably fastened to the members adjacent their leading edges having outer portions that extend radially outward from outer edges of the members supporting the blades and serrated forward cutting edges, and a positioning pin secured to the lowermost end of the shank for drilling a positioning hole in the ice.

23 Claims, 4 Drawing Sheets

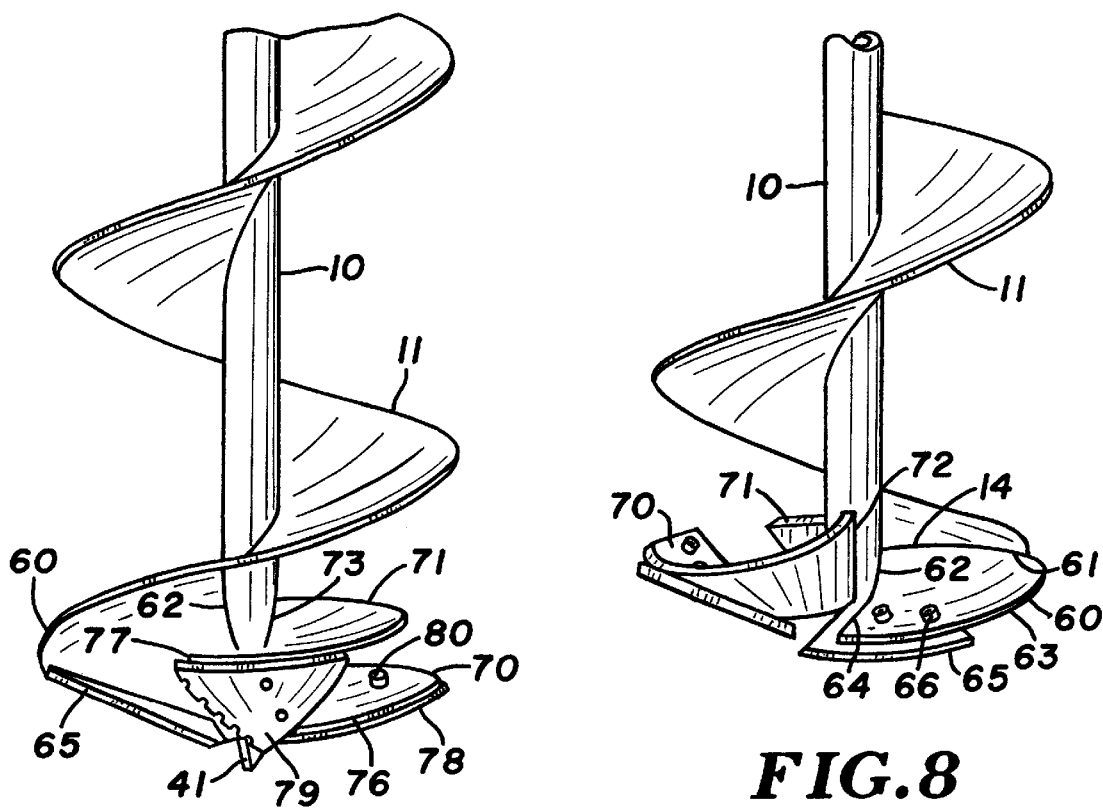
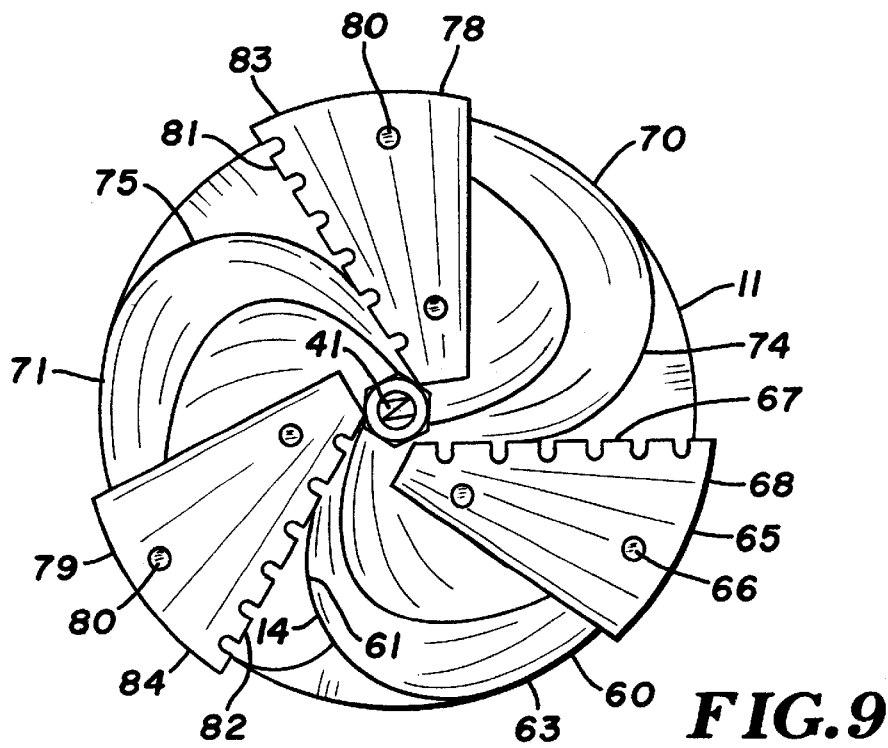

ICE AUGER CUTTING HEAD

CROSS REFERENCE TO RELATED APPLICATION

This application claims the priority benefit of U.S. Provisional Application Ser. No. 60/239,951 filed Oct. 16, 2000.

BACKGROUND OF THE INVENTION

1. Field of the Invention

The present invention relates to two embodiments of an ice auger cutting head characterized by flat sharp serrated replaceable cutting blades disposed at the lower end of an upright drive shank which has a spiral flighting or helical auger blade along a substantial portion of its length. The drive shank is rotated to cut down through a body of ice against which the cutting head is advanced for drilling holes through the ice for ice fishing.

2. Prior Art

Fabiano U.S. Pat. No. 5,302,059 shows a drill bit having three (or more) flat replaceable cutting edges equally spaced around the longitudinal axis at the end of the bit. The purpose is said to be to cut smaller chips which are easier to remove, enhancing the cooling of the drill and workpiece. However, the drill is for accurately cutting holes in metal. The radial displacement of each cutting edge from the axis is different.

Kortschage U.S. Pat. No. 3,602,321 is directed to an ice auger intended to be driven from a power take-off of a snowmobile. The cutting edges appear to be the edges of scoop-like elements at the end of a single flight auger.

Taylor U.S. Pat. No. 4,046,207 is directed to an earth auger and discloses the concept of a small diameter pilot hole followed by a series of stepped holes of increasing diameter.

Hein U.S. Pat. No. 3,175,630 is directed to a two-bladed double-flight earth auger and discloses the concept of the cutting edges being slightly beyond the edges of the auger flights to prevent binding of the auger as the hole deepens. This auger also has a lead screw which would make an initial small diameter hole.

Gilbert U.S. Pat. No. 4,074,780 is also directed to an earth auger. It is a single flight auger having a single curved edge blade and a pilot element for making a small diameter pilot hole.

Altonen U.S. Pat. No. 3,786,876 is directed to a single flight ice auger having two replaceable curved blades for cutting a hole slightly larger than the diameter of the auger. Both blades are supported on a single "attachment piece" at the end of the auger helix and shank.

Grahl U.S. Pat. No. 5,251,707 is directed to a one-piece propellor-like cutting head having opposed pairs of inner and outer blade edges. The inner blades would cut a pilot hole to be enlarged by the outer blades.

Caswell U.S. Pat. No. 5,950,738 is directed to a single flight ice auger having either one or two replaceable cutting blades. The patent is primarily concerned with means for flaring the bottom end of the hole cut through the ice.

SUMMARY OF THE INVENTION

The first two stage embodiment of the ice auger cutting head has two diametrically opposed sharp flat serrated replaceable cutting blades tilted slightly upwardly and having a radius slightly greater than that of the helical auger. Each cutting blade is supported at the leading edge of a partial helical dished concave scoop-like member secured to the shank of the auger and communicating with the helical channel of the auger. The trailing edge of one of these scoops is contiguous with the bottommost edge of the auger blade. A second pair of upwardly tilted smaller cutting blades is positioned below the first pair of blades along a transverse axis which is perpendicular to the transverse axis of the first pair of blades. Each of the smaller blades has an arcuate outer edge with a radius substantially less than that of the other blades and the auger. Each of the small blades is supported at the leading edge of a partial helical dished concave scoop each having a trailing edge connected to the leading edge of one of the first scoops spaced inwardly from the cutting edge of the larger blade. The smaller blades serve to cut a pilot hole of lesser diameter in the ice and the ice chips are carried to the larger scoops. The smaller hole is then enlarged by the larger blades and the ice chips are carried to the surface of the frozen lake or river being fished.

The second single stage embodiment of the ice auger cutting head has three sharp flat serrated replaceable cutting blades equally spaced about the vertical axis of the auger. Each blade tilts upwardly at a slight angle to its outer arcuate edge which has a radius just slightly greater than the radius of the helical auger blade. Each cutting blade is supported at the leading edge of a partial helical dished concave scoop-like member secured to the shank of the auger in a 3-leaf clover arrangement. The pitch of the partial helical scoop is substantially less than that of the helical auger blade. The trailing edge of the scoop opposite from the cutting blade communicates directly with the helical channel of the auger for elevating ice chips to the surface. The trailing edge of one of the scoops is contiguous with the bottommost edge of the helical auger blade.

BRIEF DESCRIPTION OF THE DRAWINGS

The invention is illustrated by the accompanying drawings in which corresponding parts are identified by the same numerals and in which:

FIG. 7 is an elevational view of the lower end of an ice auger carrying another embodiment of a cutting head according to the present invention.

FIG. 8 is a similar elevational view rotated clockwise approximately 120° from the view of FIG. 7;

FIG. 9 is a bottom plan view of the cutting head of FIGS. 7 and 8;

DETAILED DESCRIPTION OF THE PREFERRED EMBODIMENTS

Figure 1:
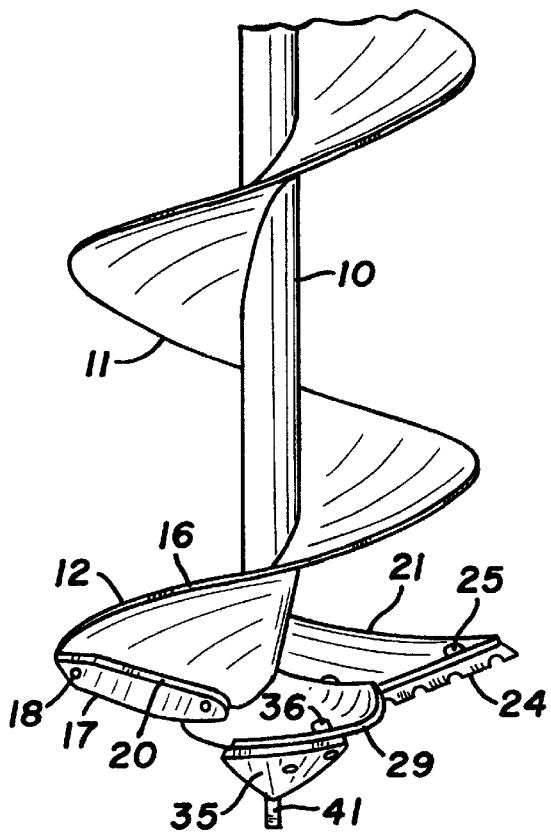
FIG. 1 is an elevational view of the lower end of an ice auger carrying one embodiment of a cutting head according to the present invention.
Figure 2:
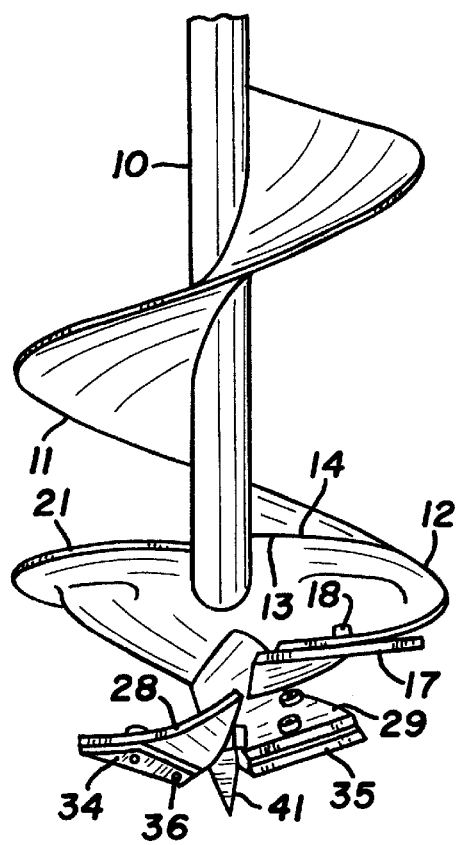
FIG. 2 is a similar elevational view rotated approximately a quarter turn counter clockwise from the view of FIG. 1.
Figure 3:
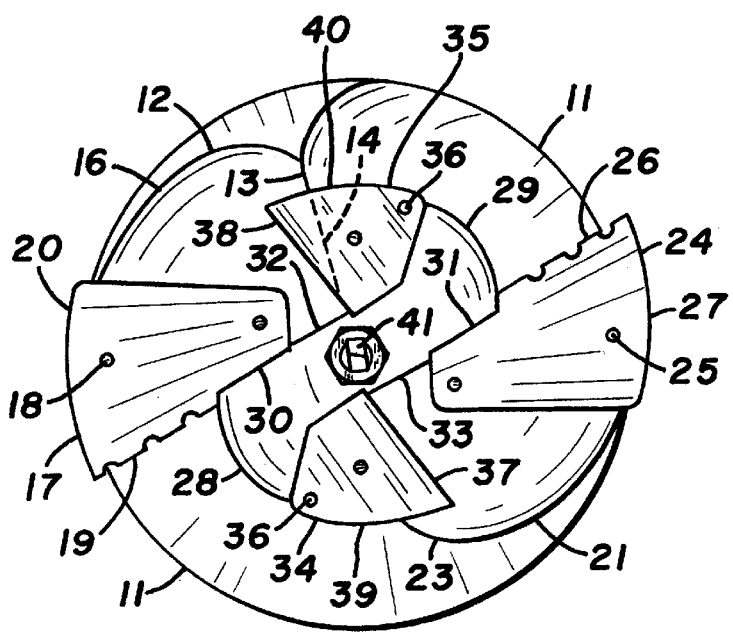
FIG. 3 is a bottom plan view of the cutting head.
Figure 4:
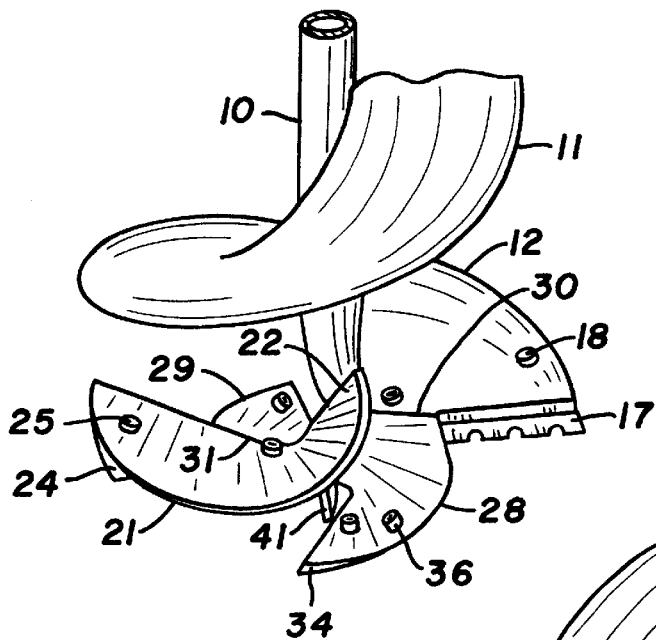
FIG. 4 is a perspective view from above of the lower end of an ice auger carrying the first embodiment of the cutting head.
Figure 5:
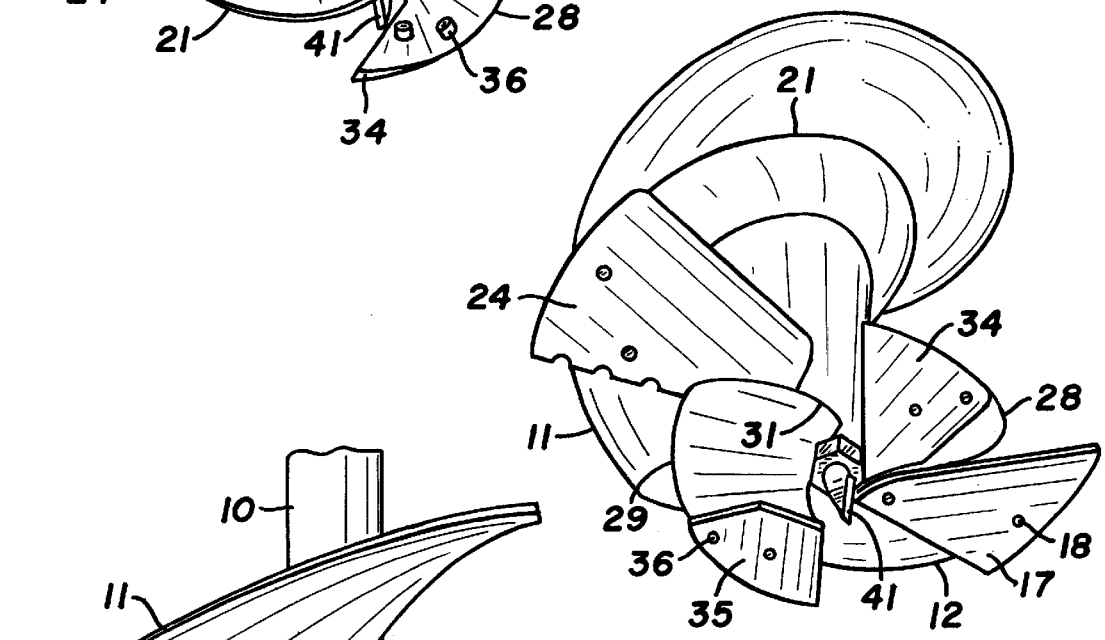
FIG. 5 is a similar perspective view from below of the cutting head at the lower end of an auger.
Figure 6:
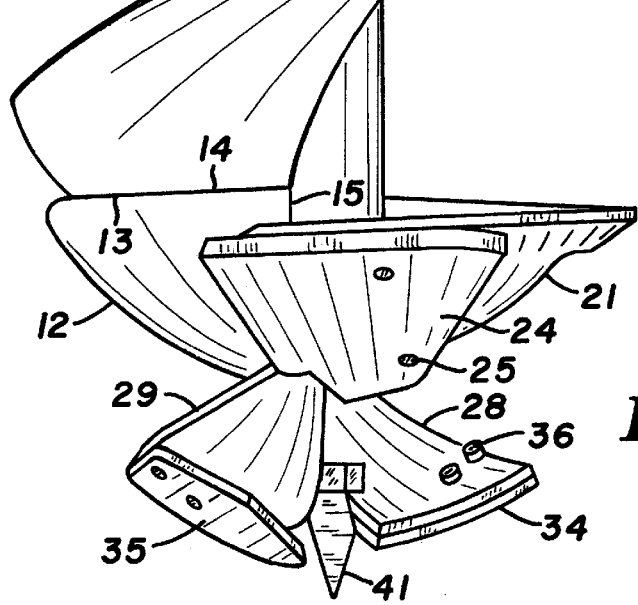
FIG. 6 is a further fragmentary elevational view of the lower end of an auger, carrying the first embodiment of the cutting head.

Referring now to the drawings, and particularly to FIGS. 1 through 6, there is shown one two stage embodiment of the invention illustrating the lowermost end of an ice auger comprising a rigid tubular shaft or shank 10 which supports a single flight helical auger blade 11 attached to the shaft by brazing or welding or the like. Auger blade 11 serves both to lift ice chips from the hole being drilled and as a guide for the auger. A first partially helical blade-supporting scoop-like member 12 has a generally radial trailing edge 13 welded or otherwise rigidly secured to the bottom leading edge 14 of helical auger blade 11 and an adjacent intersecting downwardly extending vertical edge 15 welded or otherwise secured to shaft 10. The scoop-like member 12 is partially helical in the sense that its outermost arcuate edge 16 forms a continuation of the helical auger blade. The generally radial leading bottommost edge of the scoop-like member 12 supports a serrated ice cutting blade 17, preferably removably, secured to the scoop-like member, as by means of screws 18, for sharpening or replacement. The cutting edge 19 of the blade 17 extends generally radially. The outermost arcuate edge 20 of blade 17 extends a small fraction of an inch beyond the outermost edge of the scoop-like member 12 so that the diameter of the drilled hole is slightly larger than the diameter of auger blade 11 to prevent binding of the auger in the hole and to permit easy removal of the auger.

A second partially helical blade-supporting scoop-like member 21 has a generally vertically extending edge 22 welded or otherwise secured to the auger shaft 10 and an intersecting arcuate trailing edge 23 extending generally radially outwardly and extending downwardly spaced from the next adjacent auger flight. The generally radial leading bottommost edge of the scoop-like member 21 supports a serrated ice cutting blade 24, preferably movably secured to the scoop-like member 21, as by means of screws 25. The cutting edge 26 of the blade 24 extends generally radially and the arcuate outer edge 27 of the blade extends slightly beyond the outermost edge of member 21. Blades 17 and 24 are disposed with their cutting edges 19 and 26, respectively, extending upwardly from the shaft 10 to the outer arcuate edges of the respective scoop-like members 12 and 21 at an angle of about 15 to 20 degrees from a transverse plane through the auger perpendicular to the longitudinal axis. Both scoop-like members 12 and 21 communicate directly with the spiral space defined by the auger flight on diametrically opposite side of the auger for transport of ice chips to the ice surface. The scoop-like members 12 and 21 desirably have a narrow flat lip around at least part of the circumference.

A pair of third and fourth blade supporting scoop-like members 28 and 29 are located adjacent to but downwardly from the first and second scoop-like members. The third and fourth scoop-like members 28 and 29 are similar to but smaller than second scoop-like member 12. Each has a generally radial trailing edge 30 and 31, respectively, welded or otherwise secured to the generally radial leading edges 32 and 33 of the first and second scoop-like members 12 and 21. A pair of smaller cutting blades 34 and 35 are secured to the leading edges of the third and fourth scoop-like members, preferably removably secured as by screws 36. The cutting edges 37 and 38 of the blades extend generally radially and are disposed at an upward angle of about 15 to 20 degrees. Arcuate outer edges 39 and 40 extend between the leading and trailing radial edges of the scoop-like members.

Blades 34 and 35 are disposed along an axis generally perpendicular to that of blades 12 and 21. The distance between the outermost edges of blades 34 and 35 is preferably about 50 to 65% of the distance between the outermost edges of blades 12 and 21. Blades 34 and 35 thus cut a pilot hole of smaller diameter to be enlarged by blades 12 and 21. Third and fourth scoop-like members 28 and 29 communicate with the first and second members, respectively, for transport of ice chips first to the latter members and then to the spiral space defined by the auger flight. The third and fourth scoop-like members are desirably formed in one piece welded or otherwise secured to the bottommost end of shaft 10, as well as to members 12 and 21. A sharp locating pin or positioning point 41 is desirably secured to the lowermost end of shaft 10 aligned with the longitudinal axis of the auger to fix the auger at the location on the ice surface where a hole is to be drilled.

Figure 10:
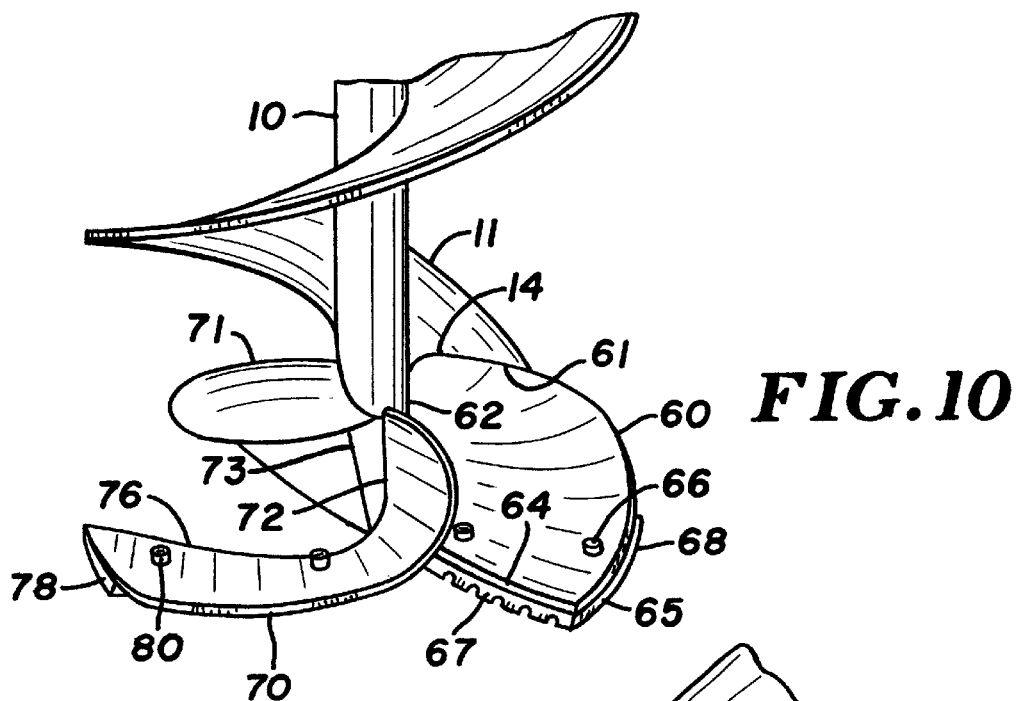
FIG. 10 is perspective view from above of the lower end of an ice auger carrying the other embodiment of cutting head.
Figure 11:
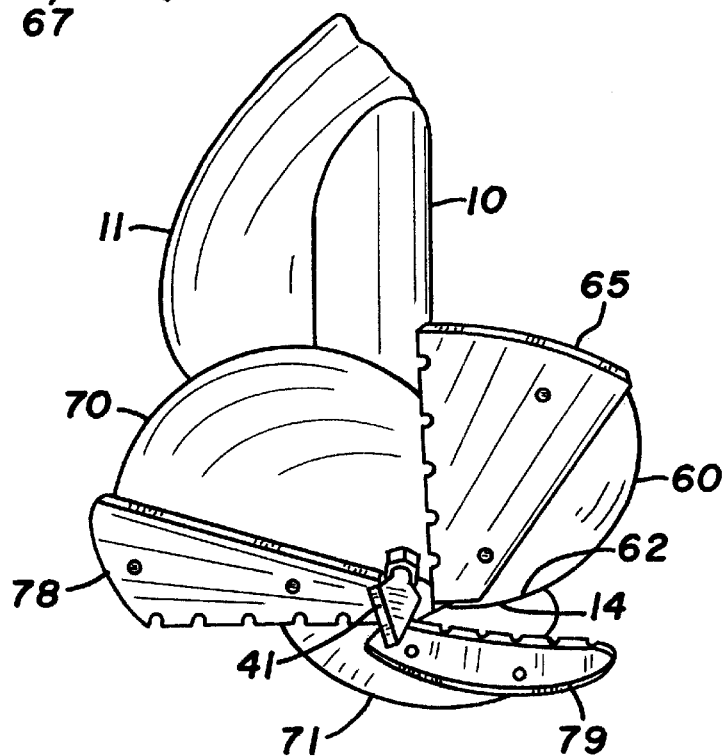
FIG. 11 is a similar perspective view from below of the cutting head at the lower end of an ice auger.

Referring to FIGS. 7 through 11 there is shown a further single stage embodiment of the invention illustrating the lowermost end of a similar ice auger likewise comprising a rigid tubular shaft or shank 10 supporting a single flight helical auger blade 11 attached to the shaft by brazing or welding or the like. The first of three similar blade supporting partially helical scoop-like members 60 has a generally radial straight trailing edge 61 welded or otherwise rigidly secured to the straight bottom leading edge 14 of the helical auger blade 11 and an adjacent intersecting downwardly extending generally vertical edge 62 welded or otherwise secured to shaft 10. The scoop-like member 60 is partially helical in the sense that its outer arcuate edge 63 forms a continuation of the helical auger blade. The generally radial leading bottommost edge 64 of the scoop-like member 60 supports a serrated ice cutting blade 65, preferably removably secured to the scoop-like member, as by means of screws 66, for sharpening or replacement. The cutting edge 67 of blade 65 extends generally radially. The outermost arcuate edge 68 or blade 65 extends a small fraction of an inch beyond the outermost edge 63 of the scoop-like member 60 so that the diameter of the drilled hole is slightly larger than the diameter of auger blade 11 to prevent binding of the auger in the hole and to permit easy removal of the auger.

Second and third blade supporting scoop-like members 70 and 71 are spaced approximately equally about the longitudinal axis of the auger on opposite sides of member 60 in a three leaf clover pattern. Scoop-like members 70 and 71 each have a generally vertically extending edge 72 and 73, respectively, welded or otherwise secured to shaft 10, and generally arcuate intersecting trailing edges 74 and 75, respectively, extending downwardly from the next adjacent auger flight. The generally radially extending bottommost leading edges 75 and 77 of the respective scoop-like members 70 and 71 support serrated ice cutting blades 78 and 79, respectively. Blades 78 and 79 are likewise preferably removable for sharpening or replacement and are removably secured, as by means of screws 80. The respective cutting edges 81 and 82 of blades 78 and 79 extend generally radially and the respective arcuate outer edges 83 and 84 of the blades likewise extend slightly beyond the outermost edges of the blade supporting members. Blades 65, 78 and 79 are each disposed with their respective cutting edges 67, 74 and 75 extending outwardly and upwardly from the shaft 10 to the outer edges of the respective scoop-like blade supports 60, 70 and 71 at an angle of about 15 to 20 degrees from a transverse plane through the auger perpendicular to the longitudinal axis. The scoop-like blade supports 60, 70 and 71 communicate with the spiral space defined by the auger blade for transport of ice chips to the ice surface. The scoop-like members 60, 70 and 71 desirably have a narrow flat outwardly and upwardly extending lip around at least part of the circumference. A sharp locating pin or positioning point 41 is desirably secured to the lowermost end of shaft 10 aligned with the longitudinal axis of the auger to fix the auger at the location on the ice surface where a hole is to be drilled.

Ice augers equipped with cutting heads according to the present invention are operated in the conventional manner. A downward force is applied to the top of the auger and the auger is rotated, either manually or power driven. The auger is positioned by driving the positioning point 41 into the ice surface at the desired location and drilling the hole. After the ice sheet has been penetrated the auger is withdrawn and the hole is ready for fishing.

What is claimed is:

1. An apparatus for making a fishing hole in ice on a body of water comprising: an auger having an elongated shank, a helical flight secured to the shank, said helical flight having a bottom leading edge and a vertical edge, a partially helical scoop-like first member having a generally radial trailing edge and a generally radial leading bottom edge, means securing the trailing edge to the bottom leading edge and vertical edge of the helical flight, an ice cutting first blade, means securing the ice cutting first blade to the helical scoop-like member adjacent the leading bottom edge of said member, a partially helical scoop-like second member having a generally vertically extending edge secured to the shank, an arcuate trailing edge extended generally radially outwardly and downwardly spaced from a lower portion of the helical flight, and a generally radial leading bottom edge, an ice cutting second blade, means securing the ice cutting second blade to the second member adjacent the bottom leading edge of the second member, and a positioning point secured to the lowermost end of the shank aligned with the longitudinal axis of the shank for drilling a positioning hole in the ice.

2. The apparatus of claim 1 wherein: the ice cutting first blade has a forward serrated cutting edge.

3. The apparatus of claim 1 wherein: the means securing the ice cutting first blade to the helical scoop-like first member includes releasable fasteners for connecting the first blade to the first member whereby the first blade can be removed from the first member for sharpening or replacement.

4. The apparatus of claim 1 wherein: the ice cutting first blade has an outer portion extended radially outward beyond the outermost edge of the helical flight whereby the diameter of the drilled hole in the ice is larger than the diameter of the helical flight.

5. The apparatus of claim 4 wherein: the ice cutting first blade has a forward serrated cutting edge.

6. The apparatus of claim 1 wherein: the ice cutting second blade has a forward serrated cutting edge.

7. The apparatus of claim 1 wherein: the means securing the ice cutting second blade to the second member includes releasable fasteners for connecting the second blade to the second member whereby the second blade can be removed from the second member for sharpening or replacement.

8. The apparatus of claim 1 wherein: the ice cutting second blade has an outer portion extended radially outward beyond the outer edge of the second member.

9. The apparatus of claim 8 wherein: the ice cutting second blade has a forward serrated cutting edge.

10. The apparatus of claim 1 including: scoop-like third and fourth members located adjacent to and downwardly from the first and second members, means securing the third and fourth members to the shank, said third and fourth members having generally radial leading edges, ice cutting third and fourth blades located adjacent the leading edges thereof, and means securing the third and fourth blades to the third and fourth members.

11. The apparatus of claim 10 wherein: the third and fourth blades have outer portions that extend radially outward from the outer edges of the third and fourth members.

12. The apparatus of claim 10 wherein: the means securing the third and fourth blades to their respective members includes releasable fasteners for connecting the third and fourth blades to their respective members whereby the third and fourth blades can be removed from their respective members for sharpening or replacement.

13. The apparatus of claim 1 including: a scoop-like third member located adjacent to and downwardly from the first and second members, means securing the third member to the shank, said third member having a generally radial leading edge, an ice cutting third blade located adjacent the leading edge of the third member, and means securing the third blade to the third member.

14. The apparatus of claim 13 wherein: the third blade has an outer portion extended radially outward from the outer edge of the third member.

15. The apparatus of claim 13 wherein: the means securing the third blade to the third member includes releasable fasteners for connecting the third blade to the third member whereby the third blade can be removed from the third member for sharpening or replacement.

16. An apparatus for making a fishing hole in ice on a body of water comprising: an auger having an elongated shank, a helical flight secured to the shank, said helical flight having a bottom leading edge and a vertical edge, a partially helical scoop-like first member having a generally radial trailing edge and a generally radial leading bottom edge, means securing the trailing edge to the bottom leading edge and vertical edge of the helical flight, an ice cutting first blade, means securing the ice cutting first blade to the helical scoop-like member adjacent the leading bottom edge of said member, a helical scoop-like second member having a generally vertically extending edge secured to the shank, an arcuate trailing edge extended generally radially outwardly and downwardly spaced from a lower portion of the helical flight, and a generally radial leading bottom edge, an ice cutting second blade, means securing the ice cutting second blade to the second member adjacent the bottom leading edge of the second member, a partially helical scoop-like third member having a generally vertically extending edge secured to the shank, a trailing edge located below the first member, and a generally radial leading bottom edge, an ice cutting third blade, means securing the third blade to the third member adjacent the bottom edge of the third member, a partially helical scoop-like fourth member having a generally vertically extending edge secured to the shank, a trailing edge located below the second member, and a generally radial leading bottom edge, an ice cutting fourth blade, means securing the fourth blade to the fourth member adjacent the bottom edge of the fourth member, and a positioning point secured to the lowermost end of the shank aligned with the longitudinal axis of the shank for drilling a positioning hole in the ice.

17. The apparatus of claim 16 wherein: at least one of the first, second, third and fourth blades has a forward serrated cutting edge.

18. The apparatus of claim 16 wherein: the means securing the first, second, third and fourth blades to their respective members includes releasable fasteners for connecting the first, second, third and fourth blades to their respective members whereby the first, second, third and fourth blades can be removed form their respective members for sharpening or replacement.

19. The apparatus of claim 16 wherein: the first, second, third and fourth blades each has an outer portion extended radially outward from the member connected to the blade.

20. An apparatus for making a fishing hole in ice on a body of water comprising: an auger having an elongated shank, a helical flight secured to the shank, said helical flight having a bottom leading edge and a vertical edge, a partially helical scoop-like first member having a generally radial trailing edge and a generally radial leading bottom edge, means securing the trailing edge to the bottom leading edge and vertical edge of the helical flight, an ice cutting first blade, means securing the ice cutting first blade to the helical scoop-like member adjacent the leading bottom edge of said member, a partially helical scoop-like second member having a generally vertically extending edge secured to the shank, an arcuate trailing edge extended generally radially outwardly and downwardly spaced from a lower portion of the helical flight, and a generally radial leading bottom edge, an ice cutting second blade, means securing the ice cutting second blade to the second member adjacent the bottom leading edge of the second member, a partially helical scoop-like third member having a generally vertically extending edge secured to the shank, a trailing edge located below the first member, and a generally radial leading bottom edge, an ice cutting third blade, means securing the third blade to the third member adjacent the bottom edge of the third member, and a positioning point secured to the lowermost end of the shank aligned with the longitudinal axis of the shank for drilling a positioning hole in the ice.

21. The apparatus of claim 20 wherein: at least one of the first, second and third blades has a forward serrated cutting edge.

22. The apparatus of claim 20 wherein: the means securing the first, second and third blades to their respective members includes releasable fasteners for connecting the first, second and third blades to their respective members whereby the first, second and third blades can be removed from their respective members for sharpening or replacement.

23. The apparatus of claim 20 wherein: the first, second and third blades each has an outer portion extended radially outward from the member connected to the blade.

* * * * *